US008096606B2

(12) United States Patent
Hanaki et al.

(10) Patent No.: US 8,096,606 B2
(45) Date of Patent: Jan. 17, 2012

(54) DOOR-OPENING DEVICE IN A VEHICLE SLIDING DOOR

(75) Inventors: Naoki Hanaki, Farmington Hills, MI (US); Andrew Baranowski, Windsor (CA); Bryan Farris, Livonia, MI (US)

(73) Assignee: Mitsui Kinzoku Act Corporation (JP)

( * ) Notice: Subject to any disclaimer, the term of this patent is extended or adjusted under 35 U.S.C. 154(b) by 555 days.

(21) Appl. No.: 12/254,322

(22) Filed: Oct. 20, 2008

(65) Prior Publication Data

US 2010/0095595 A1 Apr. 22, 2010

(51) Int. Cl.
*B60J 5/06* (2006.01)

(52) U.S. Cl. .............. 296/155; 49/209; 49/360; 49/358; 49/218; 296/146.11

(58) Field of Classification Search .................... 49/358, 49/359, 360, 209, 210, 216, 218, 219, 221, 49/225; 296/146.1, 155, 146.11, 146.12
See application file for complete search history.

(56) References Cited

U.S. PATENT DOCUMENTS

| | | | | |
|---|---|---|---|---|
| 4,945,677 | A * | 8/1990 | Kramer | 49/210 |
| 5,507,119 | A * | 4/1996 | Sumiya et al. | 49/218 |
| 5,921,613 | A * | 7/1999 | Breunig et al. | 296/155 |
| 6,814,394 | B2 * | 11/2004 | Yogo et al. | 296/155 |
| 6,935,071 | B2 * | 8/2005 | Yokomori et al. | 49/360 |
| 7,798,557 | B2 * | 9/2010 | Elliott et al. | 296/146.12 |
| 2005/0044794 | A1 * | 3/2005 | Kriese | 49/360 |
| 2005/0082871 | A1 * | 4/2005 | Anders | 296/155 |
| 2005/0146159 | A1 * | 7/2005 | Shen et al. | 296/155 |
| 2006/0267375 | A1 * | 11/2006 | Enomoto | 296/155 |
| 2008/0100091 | A1 * | 5/2008 | Kunishima et al. | 296/146.1 |
| 2009/0000200 | A1 * | 1/2009 | Heuel et al. | 49/209 |

FOREIGN PATENT DOCUMENTS

| | | | |
|---|---|---|---|
| JP | 2007-138630 | A | 6/2007 |
| JP | 2007-276551 | A | 10/2007 |

* cited by examiner

*Primary Examiner* — Gregory J. Strimbu
(74) *Attorney, Agent, or Firm* — Ostrolenk Faber LLP

(57) ABSTRACT

A sliding door in a vehicle includes a motor unit, a guide positioned rail along the sliding door, a slider that slides along the guide rail, a cable coupled to the motor unit, a hinge unit in which the outer thereof end is pivotally mounted to a body of the vehicle and the inner thereof is pivotally mounted to the slider, and a control lever pivotally mounted to the slider and coupled to the hinge unit. The cable is pulled by in the motor unit to turn the control lever, which turns the hinge unit and moves the sliding door from a closed position to a projecting position for opening.

4 Claims, 6 Drawing Sheets

DOOR-OPENING DEVICE IN A VEHICLE SLIDING DOOR

BACKGROUND OF THE INVENTION

The present invention relates to a door-opening device for opening and closing a sliding door in a vehicle electrically.

JP2007-138630A discloses a door-opening device for opening and closing a sliding door electrically. The door-opening device supports a sliding door which moves from a closed position to a projecting position along the side of the vehicle body with a hinge unit comprising a parallel link. The sliding door is connected to a cable driven by a motor in the body to allow the sliding door to move from the closed position to the projecting position from which the door slides to a full-open position.

In the door-opening device, the cable is connected to the motor and the sliding door in the vehicle body. So the cables and its structure are complicated and the device increases its manufacturing cost.

SUMMARY OF THE INVENTION

In view of the disadvantages, it is an object of the invention to provide a door-opening device in a vehicle sliding door in which a door is driven by a motor via cables to open and close, the cables being arranged more simply.

BRIEF DESCRIPTION OF THE DRAWINGS

The features and advantages of the invention will become more apparent from the following description with respect to an embodiment as shown in accompanying drawings.

DETAILED DESCRIPTION OF PREFERRED EMBODIMENT

Figure 1:
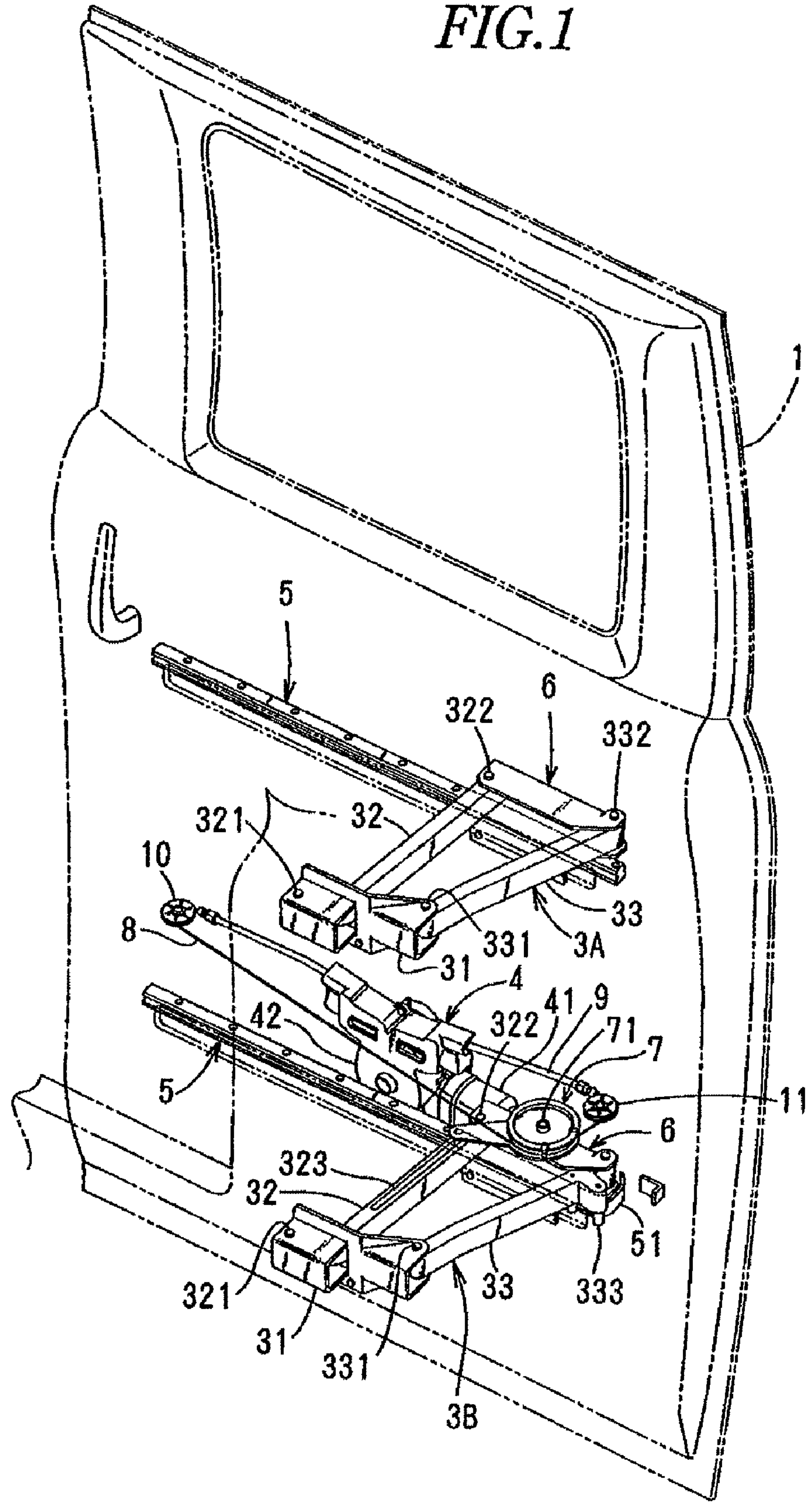
FIG. 1 is a perspective view of a door-opening device when a sliding door is in a projecting position.
Figure 2:
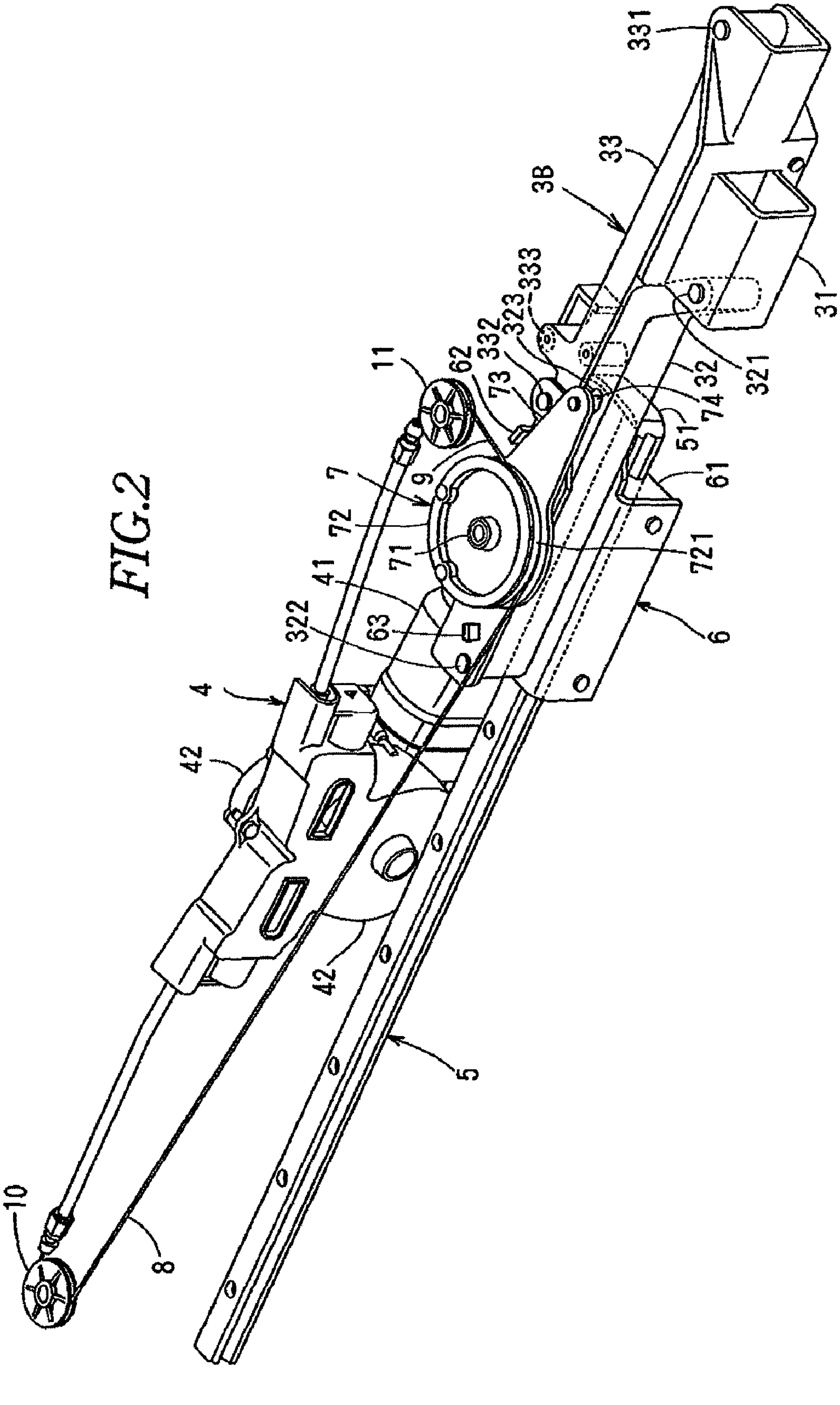
FIG. 2 is an enlarged perspective view of the door-opening device seen from the interior of a vehicle.
Figure 3:
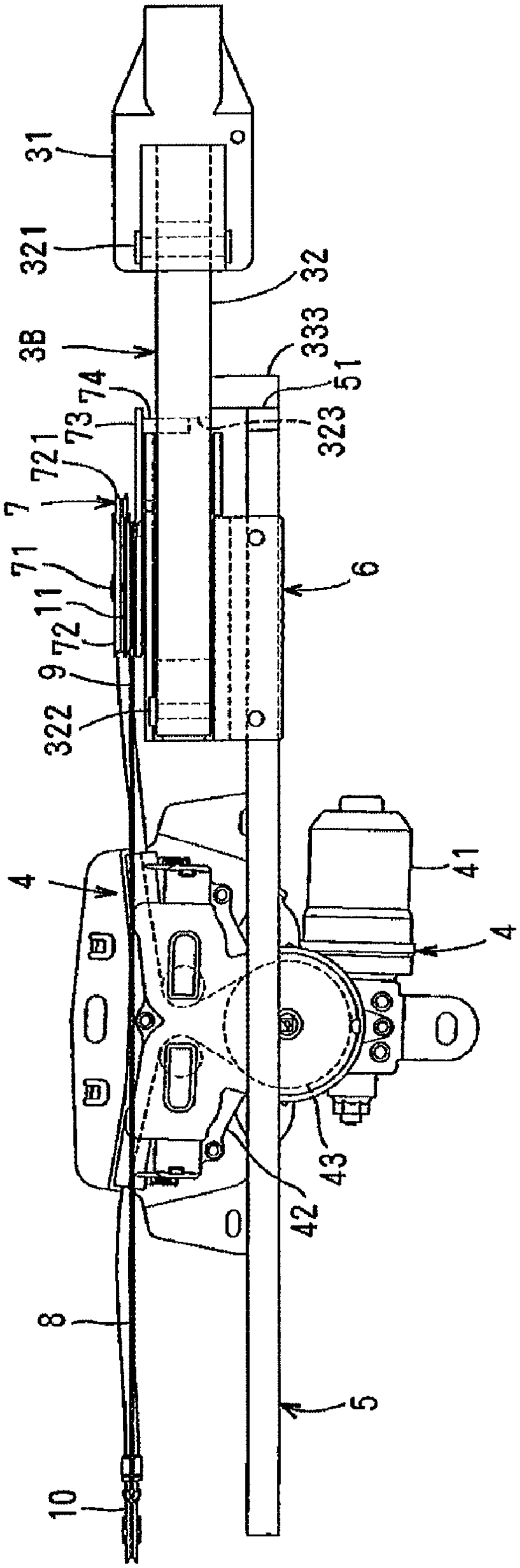
FIG. 3 is a side elevational view of the door-opening device seen from the interior of the vehicle.
Figure 4:
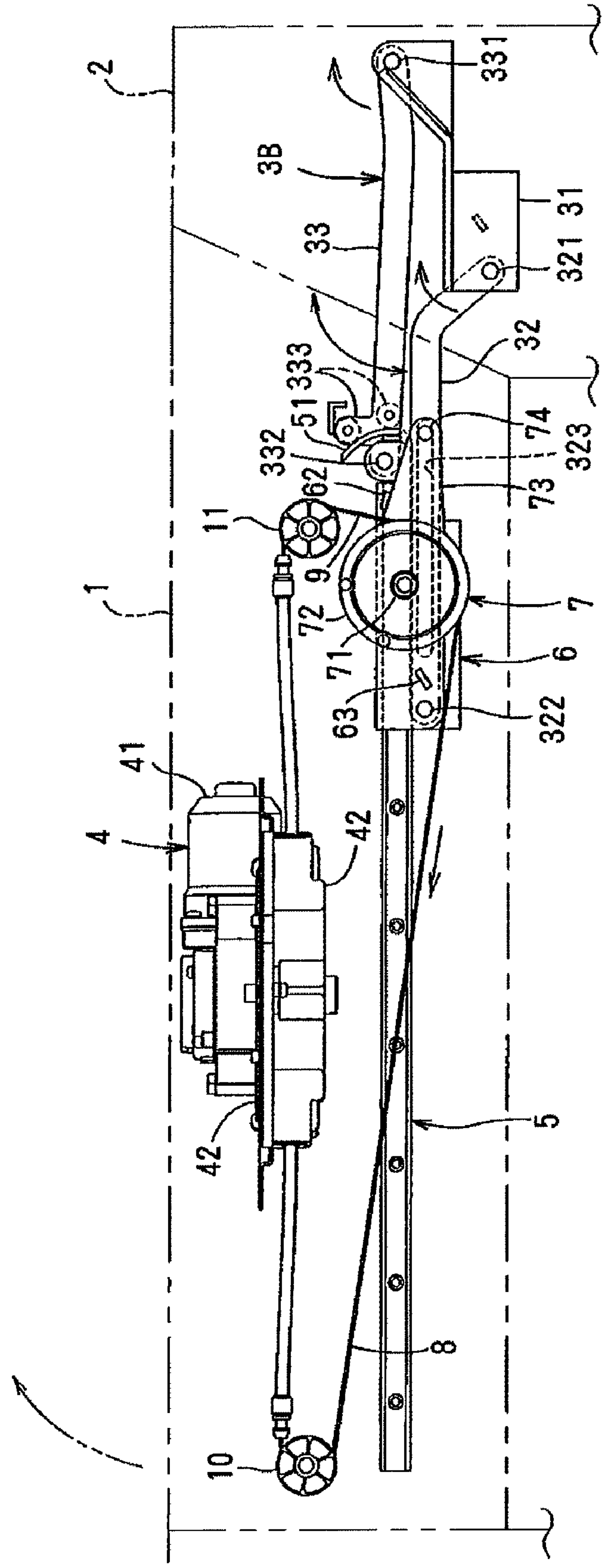
FIG. 4 is a top plan view of the door-opening device when the sliding door is in a closed position.
Figure 5:
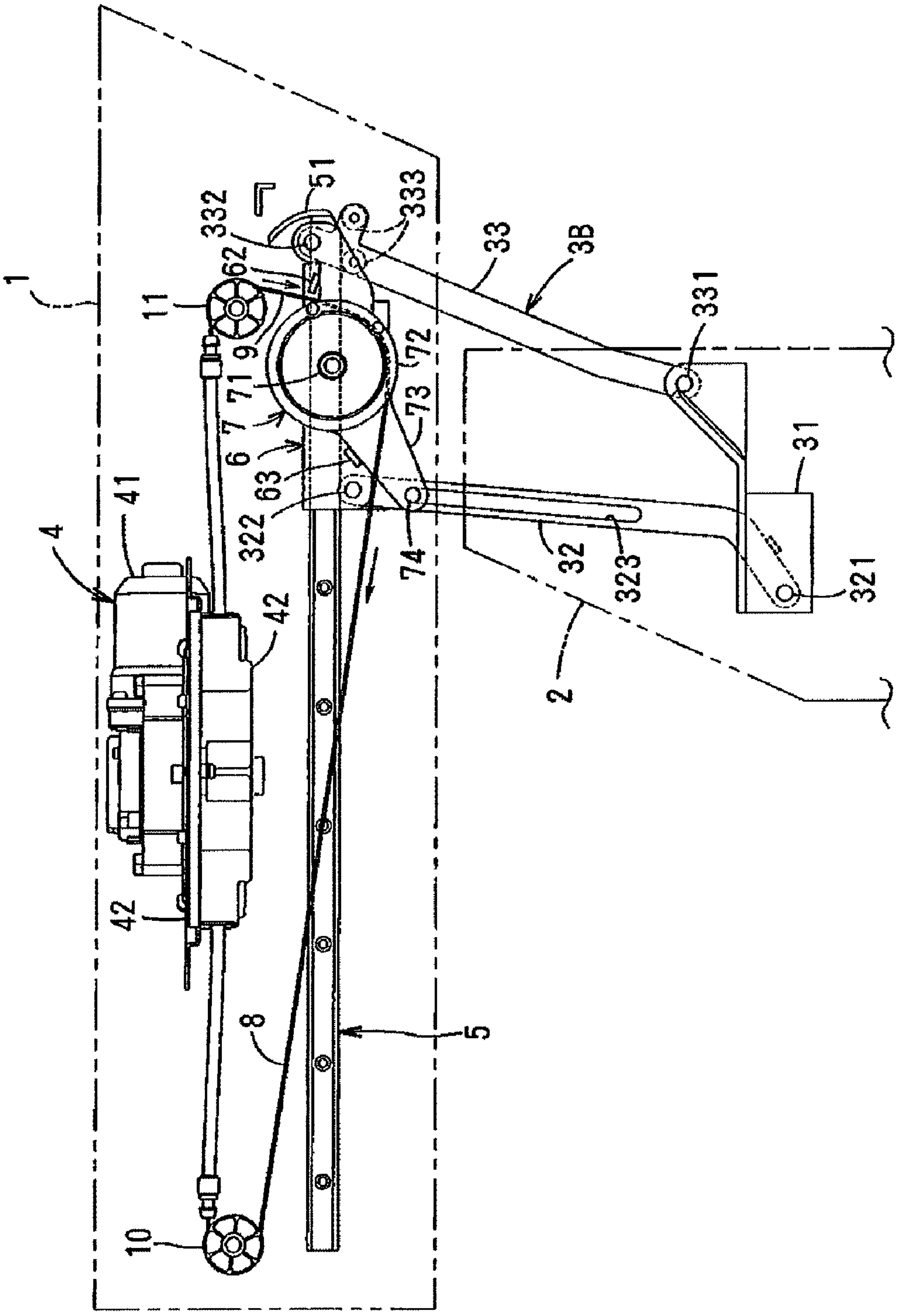
FIG. 5 is a top plan view of the door-opening device when the sliding door is in the projecting position.
Figure 6:
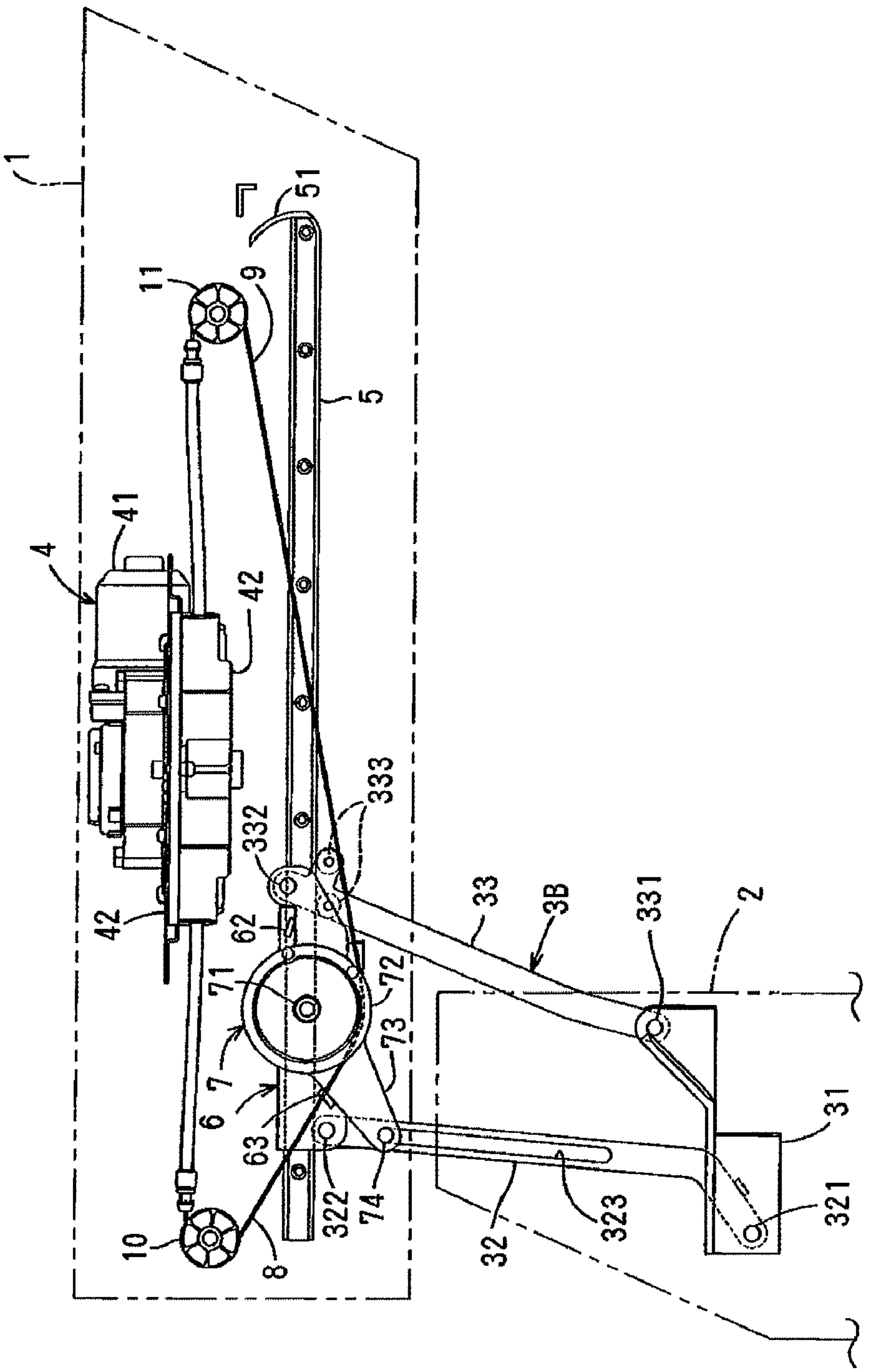
FIG. 6 is a top plan view of the door-opening device when the sliding door is in a full-open position.

In the following description, the left and right in FIGS. 1-6 are the front and rear of a vehicle respectively. The front and back in FIGS. 1-3 are inside and outside of the vehicle respectively, and the upper and lower parts in FIGS. 4-6 are the outside and inside of the vehicle respectively.

A sliding door 1 is supported by a vehicle body 2 to open and close an entrance (not shown) of the body 2. Upper and lower hinge units 3A,3B support the sliding door 1 so that the door 1 can open and close over the body 2. A motor unit 4 generates a force for moving the sliding door 1.

The sliding door 1 moves with the motor unit 4 from a closed position in FIG. 4 closing the entrance nearly flat along the side of the body 2 to a projecting position in FIG. 5 projecting outward a little from the side of the body 2. The door 1 further slides rearward to a full-open position in FIG. 6. The door 1 closes in a direction opposite to opening. A full-closing door latch (not shown) provided on the sliding door 1 engages with the body 2 to allow the door 1 to be held in the vehicle, and full-open door latches (not shown) provided on the sliding door 1 engage the hinge units 3A, 3B to allow the door 1 to be held in the full-open position.

The sliding door 1 includes the motor unit 4; a pair of upper and lower guide rails 5,5; upper and lower sliders 6,6 sliding along the guide rails 5,5; and an opening cable 8 and a closing cable 9 moving by the motor unit 4 along the lower guide rail 5. The upper and lower guide rails 5,5 are fixed in the sliding door 1.

Each of the sliders 6 has a sliding portion 61 that slides back and forth along the guide rail 5. As the sliding door 1 slides, the slider 6 slides longitudinally of the guide rail 5. When the slider 6 is positioned at the back of the guide rail 5, the sliding door 1 is in the closed and projecting positions. When the slider 6 is positioned in the front of the guide rail in FIG. 6, the sliding door 1 is in the full-open position.

Each of the hinge units 3A,3B comprises a four-joint link comprising the first hinge arm 32 in the front and the second hinge arm 33 at the back. Following swinging of a control lever 7 later described, the first and second hinge arms 32,33 moves from the first position in FIGS. 2 and 4 in which the first and second hinge arms 32,33 are folded almost in parallel with the guide rail 5 in the closed position of the sliding door 1 to the second position in FIGS. 5 and 6 in which the first and second hinge arms 32,33 project outward of the vehicle body in the projecting position of the sliding door 1 and vice versa.

The inner ends of the first upper and lower hinge arms 32,32 are pivotally mounted to the front ends of upper and lower hinge brackets 31,31 fixed to the vehicle body 2 with vertical pivot shafts 321,321. The outer ends of the first hinge arms 32,32 are pivotally mounted to the front of the upper and lower sliders 6,6 with vertical pivot shafts 322,322. The inner ends of the second upper and lower hinge arms 33,33 are pivotally mounted to the back of the upper and lower support brackets 31,31 with vertical pivot shafts 331,331, and the outer ends of the second hinge arms 33,33 are pivotally mounted to the back of the upper and lower sliders 6,6 with vertical pivot shafts 332,332.

The first lower hinge arm 32 has an elongate groove 323 in which a connecting shaft 74 later described of the control lever 7 slides horizontally.

In the second lower hinge arm 33, there are two restricting rollers 333 which come in contact with an arc-like stopper 51 at the rear end of the guide rail 5 and slide along the guide rail 5. When the sliding door 1 moves from the closed position to a just-before projecting position and vice versa, the restricting roller 333 gets in touch with the rear surface of the stopper 51 to prevent the guide rail 5 or sliding door 1 from opening. When the sliding door 1 slides from the projecting position to the full-open position and vice versa, the restricting roller 333 comes in sliding contact with the side surface of the guide rail 5 to keep the first and second hinge arms 33 in the second position.

The control lever 7 that swings horizontally on a vertical pivot shaft 71 at a certain angle is pivotally mounted to the middle of the upper surface of the lower slider 6. The control lever 7 comprises a disc-like base 72 which is pivotally mounted at the center to the slider 6 with the pivot shaft 71 and coupled to an opening cable 8 and a closing cable 9; and an arm 73 which extends from the base 72 outward and is coupled to the first hinge arm 32 at the end. With the opening cable 8 and closing cable 9 by the motor unit 4, the arm 73 swings between the first position in which the arm 73 extends rearward in FIG. 4 and the second position in which the arm 73 turns clockwise from the first position and directs forward obliquely in FIGS. 5 and 6.

On the outer circumference of the base 72 of the control lever 7, there is a groove 721 in which the opening cable 8 and closing cable 9 are coupled and wound. The end of the arm 73 is fixed to the connecting shaft 74 which is in sliding engagement with an elongate groove 323 of the first hinge arm 32.

When the control lever 7 turns from the first position to the second position, the connecting shaft 74 engages in the elongate groove 323 of the first lower hinge arm 32. Thus, the first and second hinge arms 32, 33 move from the first position to the second position to allow the sliding door 1 to move from the closed position to the projecting position. When the control lever 7 turns from the second position to the first position, the connecting shaft 74 engages in the elongate groove 323 of the first lower hinge arm 32 and the first upper hinge arm 32 and second lower hinge arm 33 moves from the second position to the first position to allow the sliding door 1 move from the projecting position to the closed position. When the control lever 7 swings to the second position, the control lever 7 makes in contact with the second stopper 63 of the slider 6 to prevent the control lever 7 from turning further. When the control lever 7 turns to the first position, the control lever 7 comes in contact with the first stopper 62 on the slider 6 to prevent the control lever 7 from turning further.

The motor unit 4 comprises a motor 41 in the sliding door 1; a gear case 42 coupled to the motor 41 and fixed in the sliding door 1; reduction gears (not shown) for reducing rotation speed of the motor 41; and a rotary drum 43 on which the opening cable 8 and closing cable 9 are coupled and wound in FIG. 3.

The opening cable 8 extends forward from the front end of gear case 42, is wound on a pulley 10 pivotally mounted in the front of the sliding door 1 and returns rearward. The opening cable 8 which returns rearward moves along the lower guide rail 5 and is wound counterclockwise on a groove 721 of the base 72 of the control lever 7. When the sliding door 1 is in the closed position, the opening cable 8 is wound onto the rotary drum 43 by the motor unit 4 to allow the control lever 7 to swing from the first position to the second position as the opening cable 8 is pulled in.

The closing cable 9 extends rearward from the rear end of the gear case 42, is wound on a pulley 11 pivotally mounted to the rear of the sliding door 1 and returns forward. The closing cable 9 which returns forward moves along the lower guide rail 5 and is wound clockwise on the groove 721 of the base 72 of the control lever 7. When the sliding door is in the projecting position, the closing cable 9 is wound on the rotary drum 43 by the motor unit 4 to allow the control lever 7 to swing from the second position to the first position as the closing cable 9 is pulled in.

The door-opening device in this embodiment will operate as shown in FIGS. 4-6.

When the sliding door 1 is in the closed position in FIG. 4, the rotary drum 43 rotates with a switch (not shown) on the body 3 by the motor 41, so that the opening cable 8 is wound onto the drum 43 and the closing cable 9 is taken off the drum 43.

The opening cable 8 is wound onto the rotary drum 43 and moves in a direction of an arrow in FIG. 4 to allow the control lever 7 to swing from the first position to the second position. Thus, the lower hinge arm 32 follows swinging of the control lever 7 with the connecting shaft 74 in the elongate groove 323. The first upper and lower hinge arms 32 and the second upper and lower hinge arms 33 swing clockwise in FIG. 4 around the pivot shaft 321 and the pivot shaft 331 respectively to allow the sliding door 1 to move from the closed position to the projecting position.

While the sliding door 1 moves from the closed position to the projecting position, the restricting roller 333 makes in contact with the stopper 51 to prevent the guide rail 5 from moving rearward with respect to the slider 6, so that the sliding door 1 does not slide toward an opening direction until it moves to the projecting position.

When the control lever 7 swings to the second position in FIG. 5, the sliding door 1 moves to the projecting position with swinging of the first and second hinge arms 32,33. When the second hinge arm 33 moves to the projecting position, the restricting roller 333 leaves the stopper 51 to allow the slider 6 to slide along the guide rail 5 and to enable the sliding door 1 to slide in a direction of opening.

When the sliding door 1 is in the projecting position, the opening cable 8 is wound onto the rotary drum 43. A pulling force by the opening cable 8 is transferred to the slider 6 via the control lever 7 which is in the second position. Thus, the sliding door 1 slides to the full-open position in FIG. 6 by the pulling force of the opening cable 8 and stops in the position. While the sliding door 1 slides from the projecting position to the full-open position, the restricting roller 333 keeps in sliding contact with the side surface of the guide rail 5 to hold the second hinge arm 33 in the second position to allow the sliding door 1 to slide from the projecting position in the opening direction surely.

The sliding door 1 in the full-open position is closed with the switch. The rotary drum 43 rotates with the motor 41 to allow the closing cable 9 to be wound on and to allow the opening cable 8 to be taken out of the motor unit 41.

When the closing cable 9 is wound on the rotary drum 43, a pulling force of the closing cable 9 is transferred to the slider 6 via the control lever 7. The restricting roller 333 keeps in sliding contact with the side of the guide rail 5 to allow the second hinge arm 33 to be kept in the second position. The control lever 7 is held in the second position and prevented from swinging to the first position. Thus, the sliding door 1 moves rearward from the full-open position in FIG. 6 by the pulling force of the closing cable 9. When the sliding door 1 comes to the projecting position, the restricting roller 333 which keeps in sliding contact with the side of the guide rail 5 leaves the side of the guide rail 5 to allow the control lever 7 to swing from the second position to the first position. When the closing cable 9 is further wound onto the rotary drum, the first and second hinge arms 32,33 follows swinging of the control lever 7 from the second position to the first position and swing from the projecting position to the closed position. Thus, the sliding door 1 moves to the closed position owing to swinging of the first and second hinge arms 32,33 to the first position.

The foregoing merely relates to an embodiment of the invention. Various changes and modifications may be made by those skilled in the art without departing from the scope of claims wherein:

What is claimed is:

1. A door-opening device for opening and closing a sliding door in a vehicle, comprising:

a motor unit fixed in the sliding door;

a guide positioned rail along and in the sliding door;

a slider that slides along the guide rail;

an opening cable coupled to the motor unit and driven by the motor unit;

a hinge unit in which an inner thereof end is pivotally mounted to a body of the vehicle and an outer thereof end is pivotally mounted to the slider; and a control lever comprising a circular base and an arm, the base being pivotally mounted to the slider, a circumferential groove being formed on an outer circumference of the base, the opening cable being wound in the circumferential groove of the base, the opening cable being pulled in by the motor unit to turn the control lever which turns the hinge unit and moves the sliding door from a closed position to a projecting position in which the sliding door projects from the vehicle via the hinge unit.

2. The door-opening device of claim 1 wherein the hinge unit comprises a four-joint link having a first hinge arm and a second hinge arm, the first hinge arm having an elongate groove, the arm of the control lever having at a free thereof end a connecting shaft which slides in the elongate groove of the first hinge arm.

3. The door-opening device of claim 1, further comprising a closing cable having one end coupled to the motor unit and the other end coupled to the control lever, the closing cable being pulled in by the motor unit to move the sliding door from the projecting position to the closed position.

4. The door-opening device of claim 1 wherein the slider has a first stopper and a second stopper, the first stopper coming in contact with the arm of the control lever when the sliding door is in the closed position, the second stopper coming in contact with the arm of the control when the sliding door lever is in the projection position.

* * * * *